Inventor
George Ruppert
By Fisher, Clapp, Soans & Pond, Attys.

Nov. 11, 1941.  G. RUPPERT  2,262,469
GLASS FEEDING APPARATUS
Filed Feb. 25, 1939   3 Sheets-Sheet 3

Inventor
George Ruppert
By Fisher, Clapp, Soans & Pond
Attys.

Patented Nov. 11, 1941

2,262,469

UNITED STATES PATENT OFFICE 2,262,469

GLASS FEEDING APPARATUS

George Ruppert, Sand Springs, Okla., assignor to Alexander H. Kerr & Company, Inc., Sand Springs, Okla., a corporation of Nevada Application February 25, 1939, Serial No. 258,428

1 Claim. (Cl. 49—55)

This invention relates generally to an apparatus for producing formed charges of molten glass adapted for charging the molds of a glass fabricating machine, and more specifically to an improved apparatus wherein a mass of molten glass is contained in a reciprocating reservoir having a bottom orifice through which the molten glass is allowed to flow, and wherein the flow is restricted by a stationary rod or plunger so that globules of glass are formed which are sheared from the mass at a point just below the orifice.

The object of this invention is to provide an apparatus of the type described which will produce a charge of molten glass having a surface which is free from tails or ripples.

It is another object of this invention to provide an apparatus which affords numerous adjustments for controlling the condition, quantity, and rate of formation of each charge.

Other objects and advantages will be apparent from the following description of an embodiment of this invention illustrated by the drawings wherein.

Figure 1:
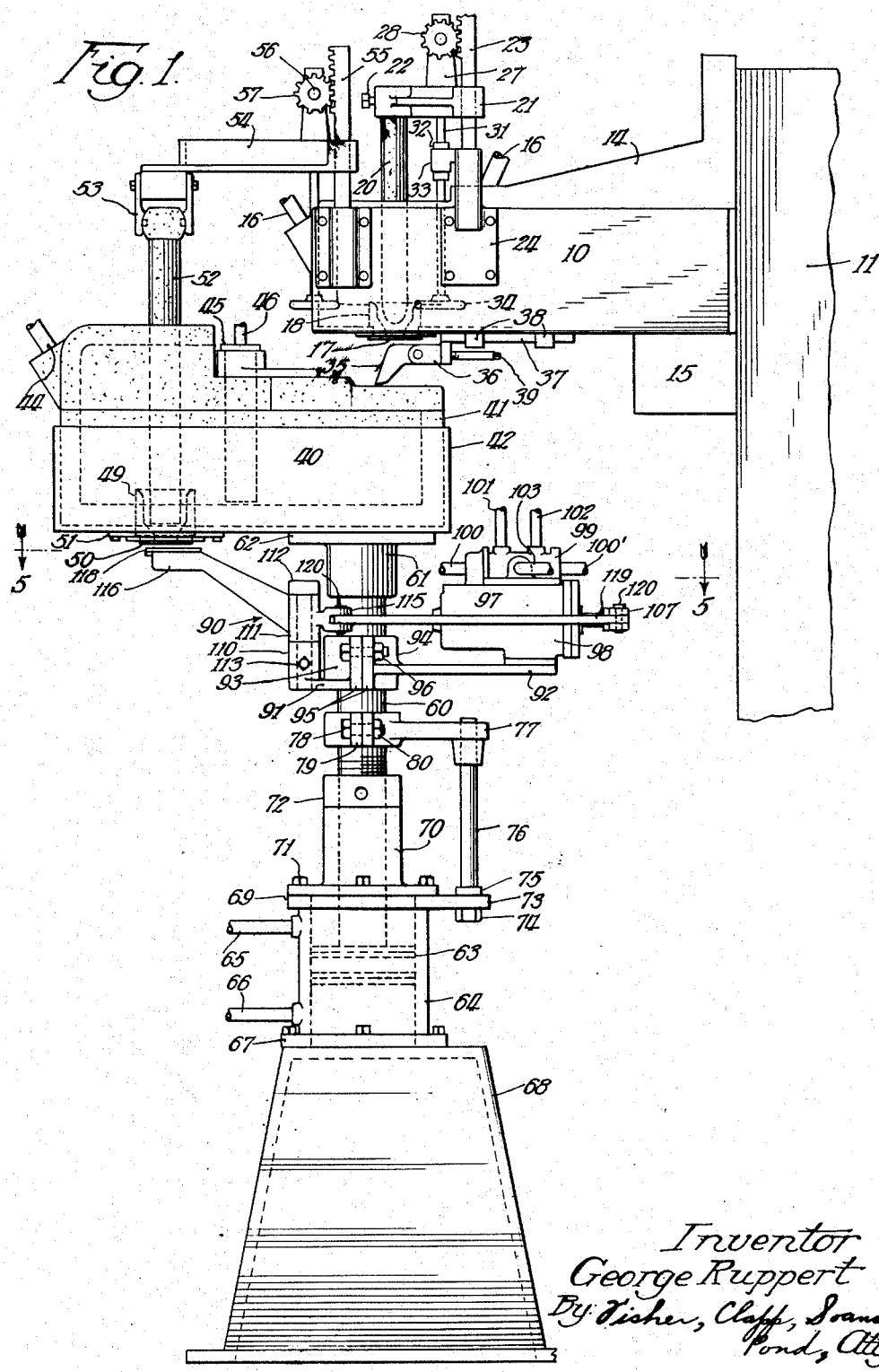
Figure 1 is a side elevation of the new apparatus.

A continuous supply of molten glass is contained in an extension or boot 10 of a glass melting tank 11. The boot is a closed container constructed of a suitable refractory material 12 which is set in a steel shell 13. The boot is rigidly supported by members 14 and 15. Set in the top and side walls of the boot are gas burners 16 for the purpose of keeping the glass supply in a molten condition. In the bottom of the boot is an orifice 17 through which the glass can be discharged from the boot 10.

The orifice 17 is formed by inserting a bushing 18 into an aperture in the bottom of the boot 10. The bushing 18 is secured in position by removable plates 19 so that bushings having different diameter orifices may be easily interchanged. The orifice 17 of the bushing 18 tapers from a large inlet opening to a smaller outlet opening. Positioned in the large inlet portion of the orifice 17 is a valve consisting of a stationary rod 20.

The rod 20 is removably supported in vertical alignment with the orifice 17 by a bracket 21 and a set screw 22. The bracket is slidably mounted on a pair of rack bars 23.

The rack bars 23 are rigidly mounted in parallel vertical positions on the sides of the boot 10 by plates 24. The rod 20 is so mounted in order that it may be raised or lowered by a suitable means with respect to the orifice 17.

Figure 2:
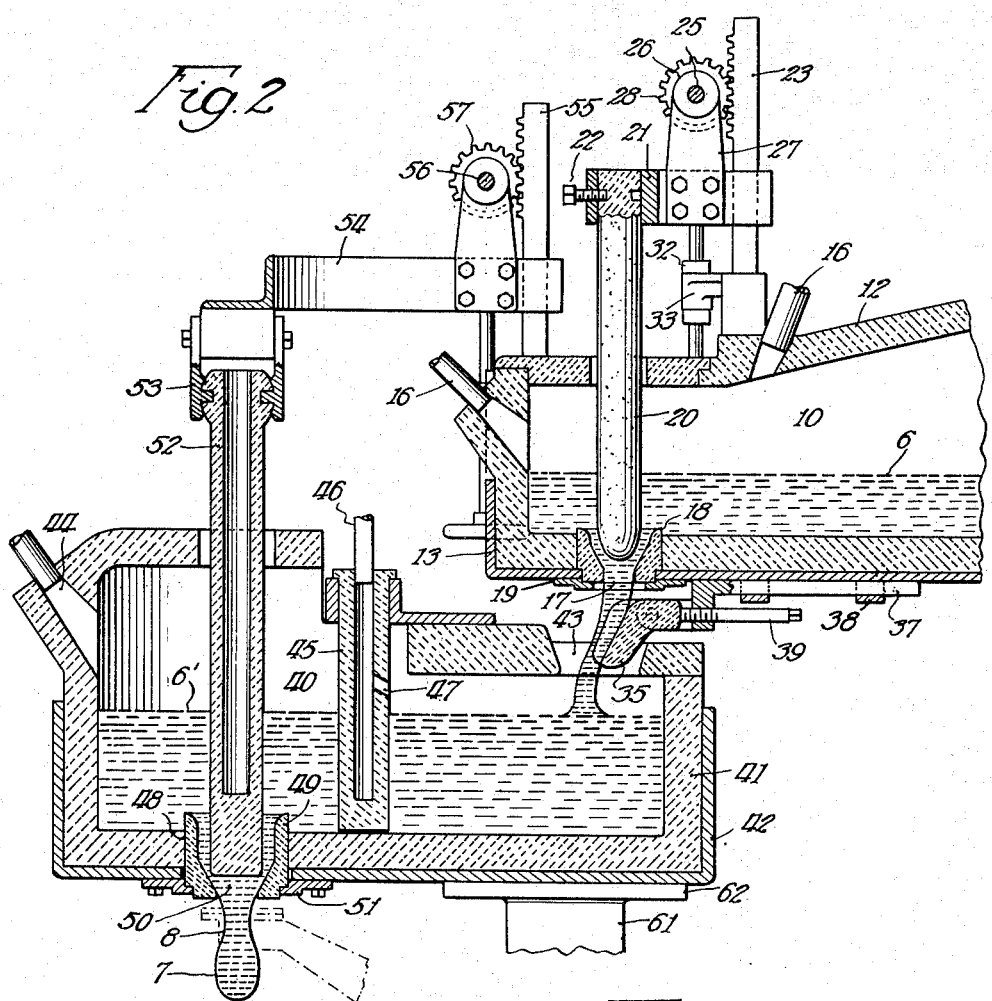
Figure 2 is an enlarged fragmentary vertical section of certain parts in Fig. 1 showing more particularly the relation between the boot and the reservoir.
Figure 3:
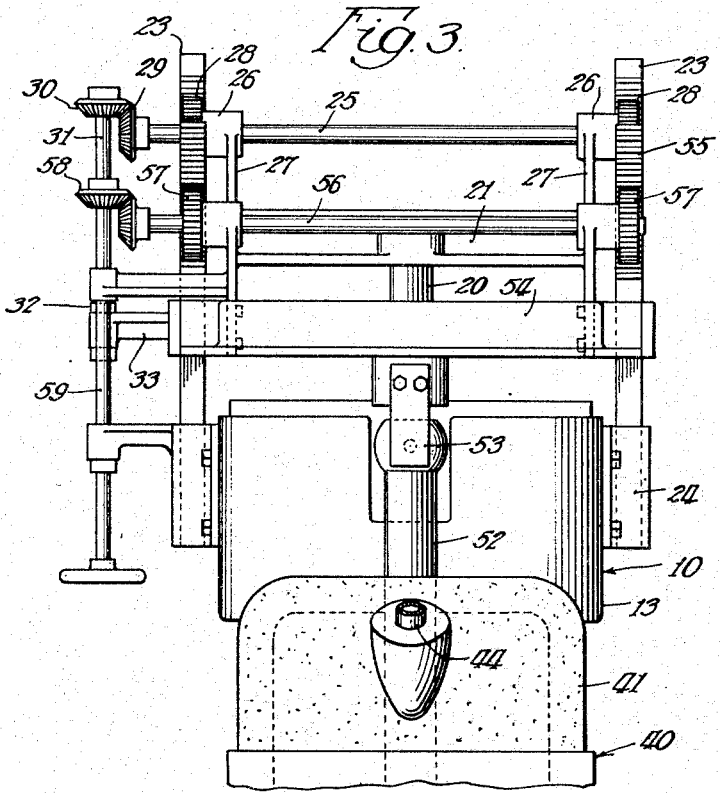
Figure 3 is a fragmentary front elevation of the upper portion of the apparatus shown in Fig. 1.
Figure 4:
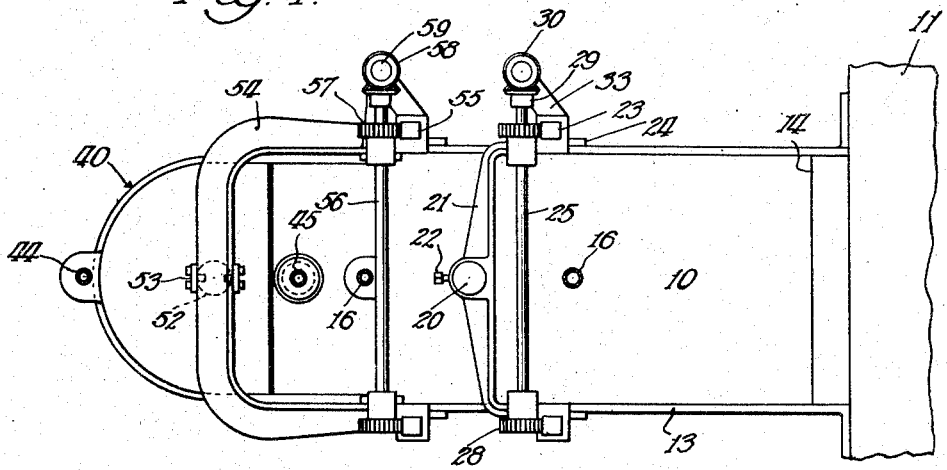
Figure 4 is a plan view of that part of the apparatus shown in Fig. 3.

The means for performing the vertical movement of the rod 20 (see Figs. 2, 3, and 4) comprises a horizontal shaft 25 rotatably supported on bearings 26 located in the upper ends of vertical arms 27 of the bracket 21. Keyed upon the shaft 25 are pinion gears 28 which are adapted to cooperate with the rack bars 23 when the shaft is rotated. The rotation is accomplished by means of a bevel gear 29 keyed at one end of the shaft 25, which gear is meshed with a second bevel gear 30 keyed on the upper end of a vertical shaft 31. The shaft 31 extends downwardly and at a right angle to the shaft 25 and is held in position by a stop collar 32 abutting an apertured arm 33 extending from the plate 24. On the lower end of the shaft 31 is fixed a hand wheel 34.

By manually turning the handwheel 34, the rotating motion is transferred by the shaft 31 to the bevel gear 30 and thus to the bevel gear 29 which in turn rotates the shaft 25 and the pinions 28. The rotation of the pinions against the stationary rack bars 23 will cause the bracket 21 to slide up or down on the rack bars 23 depending on the direction of the initial turning of the hand wheel. Any movement of the bracket 21 is transferred to the rod 20 which varies the effective diameter of the orifice 17 so as to control the rate of discharge of the glass through the orifice.

Directly beneath the orifice 17 is a trough 35 which is pivotably supported between the prongs of a fork 36. The fork 36 is carried on the end of a bar 37 which is slidably held by brackets 38 against the underside of the boot 10. Passing through the crotch of the fork 36 is a set screw 39 which acts against the trough 35. The tilt of the trough 35 can thus be adjusted by adjusting the setting of the screw 39 in the fork 36. The trough 35 guides the glass, which is discharged from the boot 10 through the orifice 17, into a reservoir 40, a portion of which is positioned beneath the boot 10.

The reservoir 40 comprises a closed container constructed of refractory material 41 fitted in a steel housing 42. The reservoir has an aperture 43 in its top wall positioned directly below the orifice 17 through which the glass enters the reservoir. At the opposite end of the reservoir is a gas burner 44 which is similar to and serves the same purpose as the gas burners 16 located in the boot 10. In the center of the reservoir through the top wall is inserted a hollow cooling block 45 which is connected to a tube 46 for supplying air or wind to the reservoir. In the portion of the block 45 within the reservoir is an aperture 47 through which the wind or air can be introduced whenever needed.

Formed in the base of the reservoir 40 is an aperture 48 into which is inserted a bushing 49 having an orifice 50. The discharge orifice 50 tapers from an enlarged inlet to a smaller outlet diameter. The bushing 49 is held in place by removable plates 51. Extending into the enlarged or well-like portion of the orifice 50 is a rod 52 which constitutes a valve.

The rod 52 is adjustably supported in vertical alignment with the orifice 50 by a clamp 53 and a bracket 54 which is slidably mounted on a rack bar 55. The adjusting mechanism comprising a shaft 56 having pinions 57 which is rotated through bevel gears 58 by a second shaft 59 is similar to that previously described for the rod 20.

The reservoir 40 is supported on the upper end of a vertical piston rod 60 by means of a collar 61 having a top flange 62. The flange 62 may be welded, riveted, or otherwise connected to the base of the reservoir. The piston rod 60 is carried by a piston 63 which reciprocates in a cylinder 64. The reciprocation of the piston 63 is transmitted through the piston rod 60 to the reservoir 40 so as to effect a relative reciprocation of the rod 52 and the orifice 50. The piston is driven by compressed air which is introduced into and exhausted from the cylinder 64 at the properly timed intervals through conduits 65 and 66. Any suitable valve mechanism may be incorporated in the air system for this purpose.

The cylinder 64 is mounted by its lower flange 67 to a foundation 68. An upper flange 69 supports a suitable bearing sleeve 70 and is connected thereto by bolts 71.

Located on a threaded portion of the piston rod 60 immediately above the gland 70 is an adjusting collar 72 which abuts the upper end of the gland 70 when the piston is in its lowermost position; thus the stroke of the piston rod 60 may be lengthened or shortened by means of the collar 72.

To prevent the piston rod 60 from rotating about its own axis during the course of its reciprocation so as to keep the orifice 50 aligned with the rod 52 there is provided a device which comprises an apertured lug 73 on the flange 69 through which is fixed by a nut 74 and a stop collar 75 a vertically extending rod 76. The rod 76 slidably engages at its upper end an apertured arm 77 of a split collar 78. The collar is fixedly clamped to the piston rod 60 through flanges 79 by bolts 80.

Figure 5:
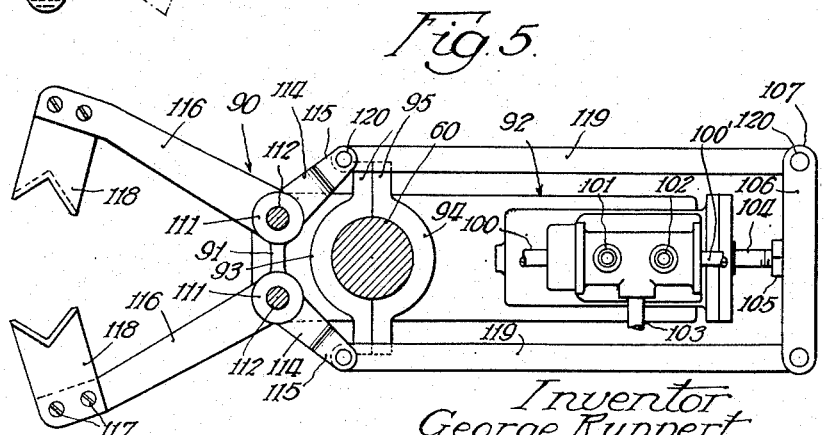
Figure 5 is an enlarged sectional plan taken on the line 5—5 of Fig. 1.

Also mounted on the piston rod 60 is a shearing mechanism 90 which reciprocates with the piston rod 60 and the reservoir 40 as a unit (see Figs. 1 and 5). This mechanism comprises two frame sections 91 and 92, each having an integral half collar 93 and 94 with flanges 95. The half collars 93 and 94 fit the rod 60 and may be clamped thereto through the flanges 95 by bolts 96 in any desired position.

Mounted on the frame section 92 is an air motor 97 comprising a cylinder housing 98 upon which is supported a valve mechanism 99. Pipes or air conduits 100, 100', 101, 102 and 103 are for purposes of operation. Pipes 100 and 100' lead to a timing mechanism which actuates the valve mechanism 99, pipes 101 and 102 supply the air which drives the motor 100 at timed intervals controlled by the valve mechanism 99, and pipe 103 supplies the air which operates the valve mechanism. The motor is double acting and its action is timed to synchronize with that of the piston rod 60. A piston rod 104 of the motor 97 having an adjusting collar 105 is connected to a yoke 106. The ends of the yoke 106 are equidistant from the rod 104 and carry apertured fork members 107.

The frame 93 includes a pair of sockets or hubs 110 upon which are pivotally mounted a pair of bell cranks 111 by means of pins 112 which pass through the hubs of the bell cranks and are secured in the sockets 110 by keys 113.

The bell cranks 111 have short horizontal arms 114 carrying forks 115 and long upwardly extending arms 116 at the ends of which are attached by bolts 117, shearing blades 118. The bell cranks 111 are mirror images so that by swinging the cranks on their respective mountings, the blades 118 will engage each other to provide an effective shearing means.

The swinging action of the bell cranks 111 is obtained by connecting the short arms 114 with the yoke 106 by means of links 119. The links 119 fit into the forked ends 107 and 115 and are secured by pins 120. When the air motor 97 drives the piston rod 104 in and out, the motion is transferred by the yoke 106 through the link 119 to the arms 114 which cause the long arms 116 to swing about pins 112 thus engaging the blades 118. The shearing mechanism 90 is preferably positioned on the piston rod 60 so that the blades 118 meet each other immediately below the orifice 50.

The operation of the above described apparatus is as follows:

A supply of molten glass 6 is maintained in the boot 10 by the furnace 11 and is kept in its molten state with the aid of the burners 16. This glass is continuously discharged through the orifice 17 into the reservoir 40. The rate of discharge is controlled by the valve or rod 20 and depends on the requirements of the glass fabricating machine to which the glass is ultimately dispensed.

The rate of reciprocation of the reservoir 40 is also dependent on the operation of the glass fabricating machine and since this variable is fixed the discharge of the glass 6' held in the reservoir 40 can only be effected by the setting of the second valve or rod 52. It is obvious that the same amount of glass supplied to the reservoir must be discharged and the rod 52, therefore, is set so that a safe head of glass is maintained in the reservoir while providing a minimum of restriction of the flow of glass when the reservoir is in its most elevated position.

The rod 52 functions as an ejecting means for the globule when the reservoir 40 is travelling upwards and then as a restricting means when the reservoir is at the top of its stroke so as to create a neck 8 in the globule 7.

The globule 7 is sheared from the stream discharged through the orifice 50 by the shearing blades 118 which are actuated as a part of the shearing mechanism 90. The mechanism is preferably timed to perform its function just as the reservoir 40 begins to travel downwardly. By having the shearing mechanism mounted so that it also reciprocates, the speed of the falling glass relative to the shearing blades may be reduced to a minimum which in turn reduces the possibility of the glass piling up on the shearing blades. The advantages of having the shearing mechanism and the reservoir reciprocating with the piston rod 60 as a unit are simplicity and compactness.

The shearing mechanism is driven by the motor 97 which is regulated by the valve mechanism 99. The reciprocation of the piston rod 104 is transmitted through the yoke 106 and links 119 to the bell cranks 111 where it is converted into an oscillating movement. The long arms of the bell cranks 116 carrying the shearing blades 118 swing together so as to bring the blades into cooperation below the orifice 50. The distance below the orifice may be adjusted by changing the position of the shearing mechanism on the piston rod 60.

It is realized that those skilled in the art may be able to make alterations in the disclosed structure without departing from the spirit of this invention and it is, therefore, intended that such changes be included within the scope of this invention as defined in the following claim.

I claim:

An apparatus for dispensing formed charges of molten glass comprising a reservoir for holding molten glass and having a discharge orifice in the bottom thereof, a stationary rod positioned in said orifice and vertically aligned therewith for restricting the flow of glass through the orifice, a vertical piston rod for supporting said reservoir, means for reciprocating said piston rod so as to effect a relative reciprocation of said stationary rod and the orifice, and means mounted on said rod for shearing the glass as it is discharged through the orifice, including two frames having an integral half collar for clamping said frames to said piston rod, a pair of bell cranks pivotally supported on one of said frames, shearing blades carried by said bell cranks and means mounted on the other of said frames for swinging said bell cranks about their supports so as to bring said shearing blades into cooperation beneath the orifice, said reservoir and shearing means reciprocating with said piston rod as a unit.

GEORGE RUPPERT.